W. J. Hubbard.
Fishing Rod.
No. 100,895. Patented Mar. 15, 1870.
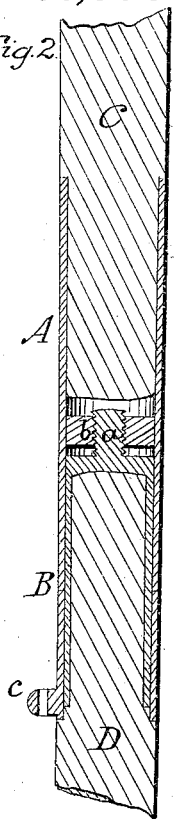
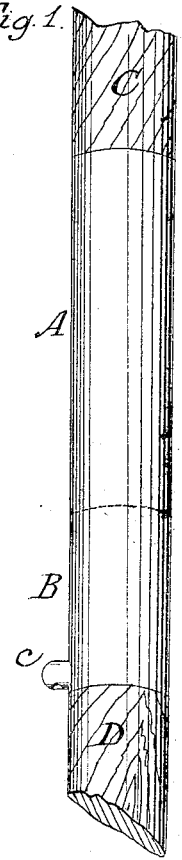
Witnesses.
M. H. Parkin
R. Fitzgerald.
Inventor.
Wilson J. Hubbard

United States Patent Office.

WILSON J. HUBBARD, OF ANSONIA, CONNECTICUT.

Letters Patent No. 100,895, dated March 15, 1870.

IMPROVEMENT IN JOINTS FOR FISHING-RODS.

The Schedule referred to in these Letters Patent and making part of the same.

To all whom it may concern:

Be it known that I, WILSON J. HUBBARD, of Ansonia, in the town of Derby, in the county of New Haven, and State of Connecticut, have invented a new and useful Improvement in Joints for Fishing-Rods or Poles; and I do hereby declare that the following is a full, clear, and exact description of the construction, character, and operation of the same, reference being had to the accompanying drawings which make part of this specification, in which—

Figure 1 is a perspective view of both parts of the joint, the joint showing one knob through which the line passes.

Figure 2 is a section of the same, cut longitudinally through the center, showing the relative positions of the two parts of the joints, the screw which secures them together, and indicates the two portions of the pole.

My improvement consists in making the socket or joint of two pieces, one to be secured to each part of the pole or rod, which two I secure to each other by a screw in the center, so that the pole or rod may be taken apart or put together with the greatest convenience and yet with the greatest strength when wanted for use.

I make the two parts of the joint or socket of German silver, or any other suitable material, of a cylindrical form, substantially as indicated at A and B, in figs. 1 and 2, with a male screw on one part, as indicated at $a$, fig. 2, and a female screw in the other part, as indicated at $b$, fig. 2, so that when the two parts are attached in the proper way to the parts or portions of the pole or rod, they may be readily united or disunited by means of the screws $a$ and $b$, as indicated in fig. 2, so that all of the joints or parts of the pole or rod will be secure.

On the outside of one of the pieces or parts 1 fit a small knob, as represented at $c$, figs. 1 and 2, with a hole through it to receive the line, so that the line may extend from end to end of the pole, and so connect with the spool on the handle part in a convenient manner.

Having made the parts, as before described, I fit the parts of the cylinder or socket, as A and B, onto two adjoining parts of the pole or rod, and secure them by any convenient means.

Any number of the joints A and B may be used, to suit the angler or the length of the pole. And after they are attached to the parts of the pole or rod, the whole will be ready to carry in as compact a form as he may desire. And, when he desires to use it for fishing, he can readily turn the male screw $a$ into the female screw $b$, and make the pole or rod one connected whole, in such a condition that it will be as secure as one stick, thus making it the most convenient to put together, and the firmest when united.

I am aware that sockets for forming joints have been secured together by screws for telescopes, stove-pipes, fishing-rods, canes, &c., too numerous to mention. I therefore do not claim any of these devices, nor do I use them; but

What I claim as my invention, and desire to secure by Letters Patent, is—

The combination of the two parts A and B of the cylinder or socket with the pole, when the two parts are constructed and fitted to be united by the male and female screws $a$ and $b$, as herein described and set forth.

WILSON J. HUBBARD.

Witnesses:
JOHN CAWELL,
ELEANOR E. HOTCHKISS.